UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA, LTD., OF MONTREAL, CANADA, A CORPORATION OF CANADA.

AMMONIATED ACID PHOSPHATE AND PROCESS OF MAKING SAME.

1,127,840.      Specification of Letters Patent.      Patented Feb. 9, 1915.

No Drawing.      Application filed June 23, 1913. Serial No. 775,435.

*To all whom it may concern:*

Be it known that we, THOMAS LEOPOLD WILLSON and MAXIMILIAN MATTHEUS HAFF, of the city of Ottawa, Province of Ontario, Dominion of Canada, have invented certain new and useful Improvements in Ammoniated Acid Phosphate and Methods of Making Same, of which the following is the specification.

This invention relates to an improved method of ammoniating acid phosphate, and the object of the invention is to prevent reversion of the compound to the insoluble form after the ammonia has been added, and it consists essentially in artificially drying the acid phosphate before the ammonia is added.

When ammonia is added to ordinary acid phosphate containing from 16 to 18 per cent. $P_2O_5$, the difficulty is met with that the ammoniated acid phosphate reverts largely to the insoluble form, which is unsuitable for fertilizing purposes. The insoluble phosphate may run as high as 50 per cent.

According to the present invention, the acid superphosphate generally containing from 10 to 13 per cent. moisture when first manufactured, is mechanically dried in any suitable drier, preferably by steam heat or reduced pressure, or both.

The drying operation is carried on until the moisture is reduced to from 6 to 7 per cent.; ammonia conveniently in the form of gas is then mixed with the dried acid phosphate in the desired proportions. It will then be found that the ammoniated acid phosphate formed, will remain in its soluble form and fit for use as a fertilizer.

With the present process the amount of insoluble phosphate in the final product will be less than one per cent.

What we claim as our invention is:

1. The herein described method of ammoniating acid phosphate which comprises first drying acid phosphate and then adding ammonia gas thereto.

2. The herein described method of ammoniating acid phosphate which comprises first reducing the amount of moisture in the phosphate to from six to seven per cent., and then adding ammonia gas thereto.

3. As a new article of manufacture, a dried ammoniated acid phosphate, substantially free from insoluble phosphate.

In witness whereof we have hereunto set our hands in the presence of two witnesses.

THOMAS LEOPOLD WILLSON.
    MAXIMILIAN MATTHEUS HAFF.

Witnesses:
    RUSSEL S. SMART,
    M. MAHONEY.